(12) United States Patent
Wu

(10) Patent No.: US 8,374,170 B2
(45) Date of Patent: Feb. 12, 2013

(54) POWER MANAGEMENT SYSTEMS AND METHODS FOR ELECTRONIC DEVICES

(75) Inventor: Tsu-Chin Wu, Taoyuan County (TW)

(73) Assignee: HTC Corporation, Taoyuan (TW)

(*) Notice: Subject to any disclaimer, the term of this patent is extended or adjusted under 35 U.S.C. 154(b) by 1093 days.

(21) Appl. No.: 12/335,427

(22) Filed: Dec. 15, 2008

(65) Prior Publication Data
US 2009/0161662 A1    Jun. 25, 2009

(30) Foreign Application Priority Data
Dec. 21, 2007  (TW) ................ 96149187 A

(51) Int. Cl.
*H04L 12/66* (2006.01)

(52) U.S. Cl. ........................................ 370/352

(58) Field of Classification Search ............ 370/352, 370/353, 354, 355, 356, 389, 392, 400, 401, 370/493, 491, 465; 713/310, 162; 709/203, 709/229
See application file for complete search history.

(56) References Cited

U.S. PATENT DOCUMENTS

| | | | |
|---|---|---|---|
| 6,101,608 A * | 8/2000 | Schmidt et al. ............ | 726/2 |
| 8,161,301 B2 * | 4/2012 | Lim et al. .................. | 713/310 |
| 2005/0286466 A1 | 12/2005 | Tagg et al. | |
| 2007/0067445 A1 * | 3/2007 | Vugenfirer et al. ......... | 709/224 |
| 2007/0238439 A1 | 10/2007 | Alon et al. | |

FOREIGN PATENT DOCUMENTS

| TW | 200709648 A | 3/2007 |
|---|---|---|
| TW | 200726195 A | 7/2007 |

OTHER PUBLICATIONS

Agarwal et al., "Wireless Wakeups Revisited: Energy Management for VoIP over Wi-Fi Smartphones", MobiSys '07, Jun. 11-13, 2007, 13 pages, XP007914373.
Chen et al., "A Push-Based VoIP Service for an Internet-Enabled Mobile Ad Hoc Network", The 3 RD. IEEE VTS Asia Pacific Wireless Communications Symposium, Aug. 25, 2006.
Sarikaya et al., "SIP Paging of Wireless LAN Hosts for VoIP", Vehicular Technology Conference, vol. 4, pp. 2345-2348, May 30, 2005.

* cited by examiner

*Primary Examiner* — Chi Pham
*Assistant Examiner* — Alexander O Boakye
(74) *Attorney, Agent, or Firm* — Birch, Stewart, Kolasch & Birch, LLP

(57) ABSTRACT

Power management systems and methods for use in an electronic device are provided. The system comprises a baseband processing unit, a wireless communication module, and an application processing unit. The baseband processing unit connects to a base station via a communication network, thereby enabling the electronic device equipped with a communication capability. The wireless communication module receives a data packet via an Internet, and determines whether the data packet conforms to a packet pattern. If so, the wireless communication module transmits a wake-up signal to the application processing unit. In response to the wake-up signal, the application processing unit enters a normal state from a sleep state, and performs an application operation in the normal state according to the data packet.

17 Claims, 4 Drawing Sheets

POWER MANAGEMENT SYSTEMS AND METHODS FOR ELECTRONIC DEVICES

CROSS REFERENCE TO RELATED APPLICATIONS

This Application claims priority of Taiwan Patent Application No. 096149187, filed on Dec. 21, 2007, the entirety of which is incorporated by reference herein.

BACKGROUND OF THE INVENTION

1. Field of the Invention

The disclosure relates generally to power management systems and methods, and, more particularly to methods and systems that manage power for electronic devices having telecommunication and wireless communication capabilities.

2. Description of the Related Art

Recently, portable devices, such as handheld devices, have become more and more technically advanced and multifunctional. For example, a handheld device may have a communication capability, a wireless communication capability, a media playback system, and various other functions. Due to increased convenience and functions of the devices, these devices have become necessities of life.

VoIP (Voice over IP) is more and more popular, and has become an application implemented in handheld devices because of broader wireless network availability and better Internet bandwidth. SIP (Session Initiation Protocol) is one of the most popular VoIP protocol. Generally, an application processing unit of the electronic device must stay on in order to handle incoming packets corresponding to VoIP.

Since the electronic device functions based on the limited power provided by a battery, and some necessary components, such as the baseband processing unit maintaining the communication capability of the electronic device, the wireless communication module, and the application processing unit handling the VoIP packets must always stay on, and consume power, power consumption is an important issue when VoIP is implemented in handheld devices.

BRIEF SUMMARY OF THE INVENTION

Power management systems and methods are provided.

An embodiment of a power management system for use in an electronic device comprises a baseband processing unit, a wireless communication module, and an application processing unit. The baseband processing unit connects to a base station via a communication network, and the application processing unit processes signals from the baseband processing unit, thereby enabling the electronic device equipped with a communication capability. The wireless communication module has a packet pattern. The wireless communication module receives a data packet via an Internet, and determines whether the data packet conforms to the packet pattern. When the data packet conforms to the packet pattern, the wireless communication module transmits a wake-up signal to the application processing unit. In response to the wake-up signal, the application processing unit enters a normal state from a sleep state, and performs an application operation in the normal state according to the data packet The power consumed by the application processing unit in the sleep state is less than that in the normal state.

In an embodiment of a power management method for use in an electronic device, a base station is connected with by a baseband processing unit via a communication network, and signals from the baseband processing unit are processed by an application processing unit, thereby enabling the electronic device equipped with a communication capability. A data packet is received by a wireless communication module via an Internet. It is determined whether the data packet conforms to the packet pattern. When the data packet conforms to the packet pattern, a wake-up signal is transmitted to the application processing unit. In response to the wake-up signal, the application processing unit enters a normal state from a sleep state, and performs an application operation in the normal state according to the data packet The power consumed by the application processing unit in the sleep state is less than that in the normal state.

Power management systems and methods may take the form of a program code embodied in a tangible media. When the program code is loaded into and executed by a machine, the machine becomes an apparatus for practicing the disclosed method.

BRIEF DESCRIPTION OF THE DRAWINGS

The disclosure will become more fully understood by referring to the following detailed description with reference to the accompanying drawings, wherein.

DETAILED DESCRIPTION OF THE INVENTION

Power management systems and methods are provided.

Figure 1:
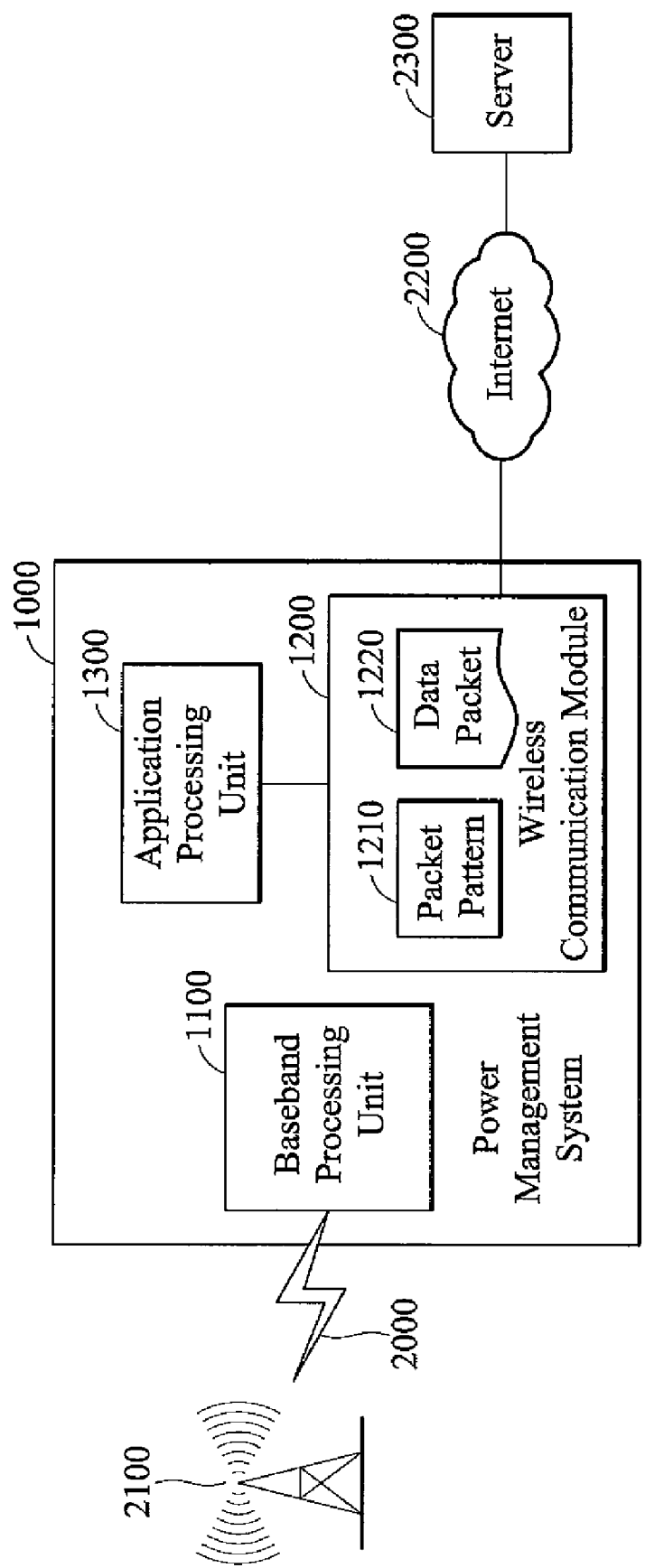
FIG. 1 is a schematic diagram illustrating an embodiment of a power management system of the disclosure.

FIG. 1 is a schematic diagram illustrating an embodiment of a power management system of the disclosure.

The power management system 1000 may be an electronic device, such as a mobile phone, a smart phone, and other devices having telecommunication and wireless communication capabilities. The power management system 1000 comprises a baseband processing unit 1100, a wireless communication module 1200, and an application processing unit 1300. The baseband processing unit 1100 is a necessary component of an electronic device, such as a mobile phone providing communication capabilities. The baseband processing unit 1100 performs related communication operations, such as voice message decoding, error correction decoding, data encryption, demodulation, channeling, and others. It is understood that, the power management system 1000 may also comprises a RF (Radio Frequency) processing unit (not shown). The RF processing unit can transmit and receive radio signals. The power management system 1000 can connect to a base station 2100 via a communication network 2000, such as a GSM network via the baseband processing unit 1100 and the RF processing unit, thereby enabling the power management system 1000 equipped with the communication capability. The wireless communication module 1200 may be a Bluetooth unit, WiFi chipset, or a wireless connection unit conforming to the IEEE 802.11 specification. The wireless communication module 1200 has at least one packet pattern 1210, and receives a data packet 1220 from a server 2300 via an Internet 2200. The wireless communication module 1200 determines whether the data packet 1220 conforms to the packet pattern 1210, and determines whether to transmit a wake-up signal to the application processing unit 1300 according to the determination result.

Figure 2:
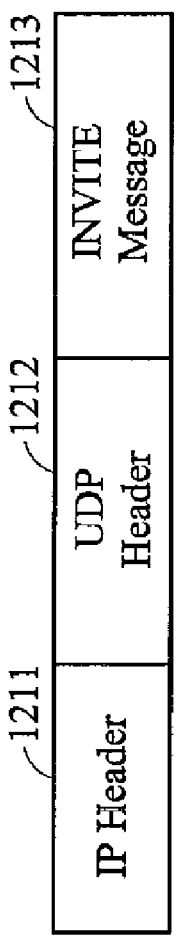
FIG. 2 is a schematic diagram illustrating an embodiment of an example of a packet pattern of the disclosure.

The application processing unit 1300 has at least two states, a sleep state and a normal state. In the sleep state, the application processing unit 1300 enters a power-saving mode. The power consumed by the application processing unit 1300 in the sleep state is less than that in the normal state. For example, in the normal state, the application processing unit 1300 can perform related processes for any data received from the baseband processing unit 1100 and the wireless communication module 1200, and execute any application in the electronic device. In the sleep state, the application processing unit 1300 selectively responses to specific data, such as incoming notification signals from the baseband processing unit 1100, thereby achieving the objective of power saving. In this embodiment, the application processing unit 1300 is used to perform related processes and operations corresponding to VoIP. The wireless communication module 1200 can determine whether the received data packet is a VoIP packet according to the packet pattern 1210. For example, when SIP is implemented in the power management system 1000, the VoIP packet may be an SIP INVITE request. In this example, the packet pattern 1210 can comprise an IP header 1211, a UDP header 1212, and an SIP INVITE message 1213, as shown in FIG. 2. When the wireless communication module 1200 determines that the data packet is a VoIP packet, the wireless communication module 1200 can transmit a wake-up signal to the application processing unit 1300, such that the application processing unit 1300 enters the normal state from the sleep state, and accordingly perform VoIP-related application operations. In some embodiments, the VoIP-related application operations comprise establishment of a session connection with the server 2300 according to the VoIP packet, and/or reception and transmission of subsequent VoIP packets. It is understood that, when the execution of the application operations ends and/or when a predefined period has been passed, the application processing unit 1300 can re-enter the sleep state. It is noted that, the disclosure is not limited to the above VoIP application. The corresponding packet patterns 1210 can be accordingly defined for various applications.

Figure 3:
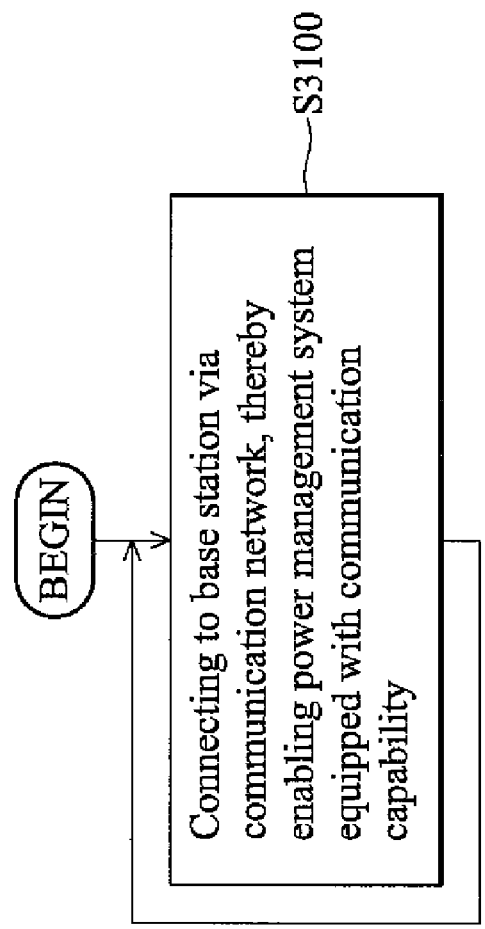
FIG. 3 is a flowchart of an embodiment of operations of a baseband processing unit of the disclosure.

FIG. 3 is a flowchart of an embodiment of operations of a baseband processing unit of the disclosure.

When the power management system 1000 boots, in step S3100, the baseband processing unit 1100 connects to the base station 2100 via the communication network 2000, and receives related signals from the base station 2100, thereby enabling the power management system 1000 equipped with the communication capability.

Figure 4:
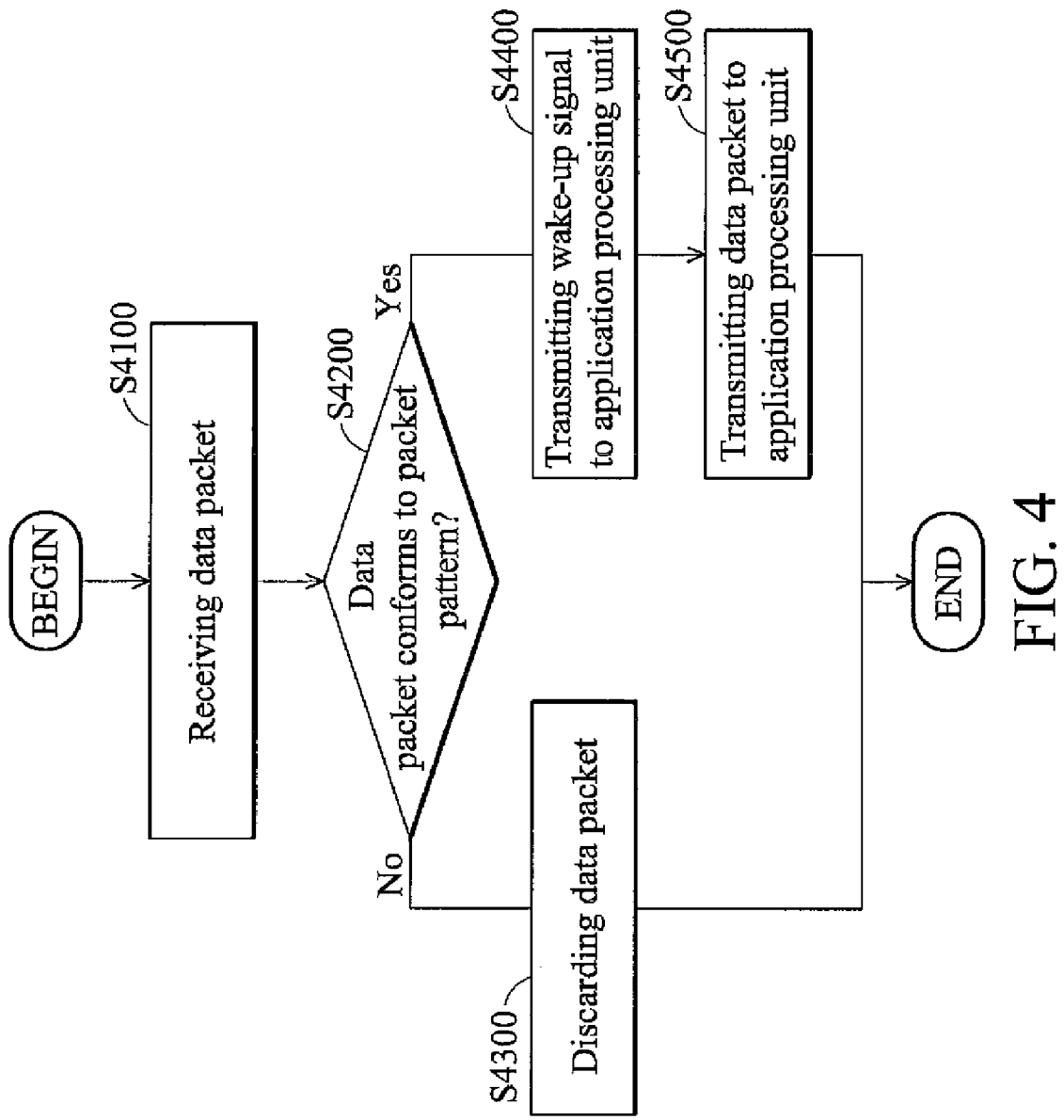
FIG. 4 is a flowchart of an embodiment of operations of a wireless communication module of the disclosure.

FIG. 4 is a flowchart of an embodiment of operations of a wireless communication module of the disclosure.

In step S4100, the wireless communication module 1200 receives a data packet 1220 via the Internet 2200. In step S4200, it is determined whether the data packet 1220 conforms to the packet pattern 1210. In the application of VoIP, the determination of whether the data packet 1220 conforms to the packet pattern 1210 is performed by determining whether the data packet 1220 is a VoIP packet, such as an SIP INVITE request. In some embodiments, the packet pattern 1210 may comprise at least an invite message. When the data packet 1220 comprises the invite message, it is determined that the data packet 1220 conforms to the packet pattern 1210. When the data packet 1220 does not conform to the packet pattern 1210 (No in step S4200), in step S4300, the data packet 1220 is discarded. When the data packet 1220 conforms to the packet pattern 1210 (Yes in step S4200), in step S4400, the wireless communication module 1200 transmits a wake-up signal to the application processing unit 1300, and in step S4500, transmits the data packet 1220 to the application processing unit 1300.

Figure 5:
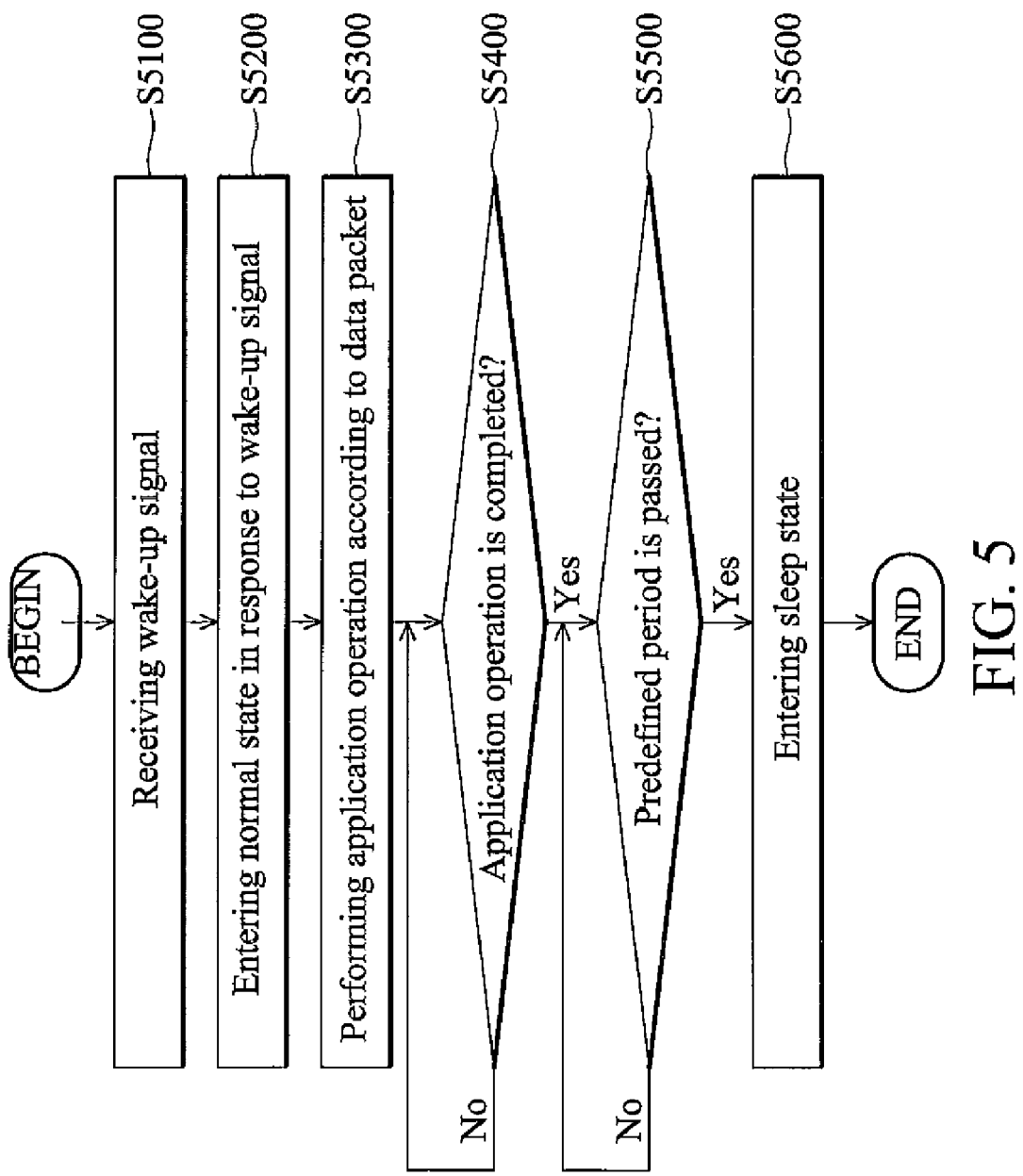
FIG. 5 is a flowchart of an embodiment of operations of an application processing module of the disclosure.

FIG. 5 is a flowchart of an embodiment of operations of an application processing module of the disclosure.

In step S5100, the application processing unit 1300 receives the wake-up signal from the wireless communication module 1200, and in step S5200, in response to the wake-up signal, the application processing unit 1300 enters the normal state from the sleep state. In step S5300, application operations are performed according to the data packet received by the wireless communication module 1200. Similarly, in the VoIP application, the application operations may comprise establishment of a session connection with the server 2300 according to the VoIP packet, and/or reception and transmission of subsequent VoIP packets. In step S5400, it is determined whether the application operations are completed. If the application operations are not completed (No in step S5400), the procedure remain at step S5400. If the application operations are completed (Yes in step S5400), in step S5500, it is determined whether the time after the application operations are completed) or an idle time of the application processing unit 1300 exceeds a predefined period. It is understood that, the predefined period can be set in the power management system 1000 in advance, and can be adjusted according to various requirements. If the time after the application operations are completed or the idle time of the application processing unit 1300 does not exceed the predefined period (No in step S5500), the procedure remains at step S5500. If the time after the application operations are completed or the idle time of the application processing unit 1300 exceeds the predefined period (Yes in step S5500), in step S5600, the application processing unit 1300 enters the sleep state.

Therefore, the power management systems and methods for electronic devices can manage power for electronic devices having telecommunication and wireless communication capabilities. When the electronic device does not receive a specific data packet, the application processing unit stays in the sleep state. When the electronic device receives the specific data packet, the application processing unit is waked up to enter the normal state to perform subsequent processes for the specific data packet.

Power management systems and methods, or certain aspects or portions thereof may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the disclosure has been described by way of example and in terms of preferred embodiment, it is to be understood that the disclosure is not limited thereto. Those who are skilled in this technology can still make various alterations and modifications without departing from the scope and spirit of this disclosure. Therefore, the scope of the present invention shall be defined and protected by the following claims and their equivalents.

What is claimed is:

1. A power management system for use in an electronic device, comprising:
   a baseband processing unit used to connecting to a communication network;
   an application processing unit processing signals from the baseband processing unit, wherein the application processing unit comprises a normal mode and a sleep mode, and the power consumed by the application processing unit in the sleep state is less than that in the normal state; and
   a wireless communication module comprising a packet pattern, receiving a data packet, and determining whether the data packet conforms to the packet pattern, when the data packet conforms to the packet pattern, transmitting a wake-up signal to the application processing unit,
   wherein, in response to the wake-up signal, the application processing unit enters the normal state from the sleep state, and performs an application operation according to the data packet, wherein the wireless communication module determines whether the data packet conforms to the packet pattern by determining whether the data packet is a VoIP packet.

2. The system as claimed in claim 1, wherein when the application operation is completed, the application processing unit enters the sleep state.

3. The system as claimed in claim 1, wherein when the application operation is completed and when a period has passed, the application processing unit enters the sleep state.

4. The system as claimed in claim 1, wherein the VoIP packet comprises an SIP (Session Initiation Protocol) INVITE request.

5. The system as claimed in claim 1, wherein the application operation comprises establishment of a session connection according to the VoIP packet.

6. The system as claimed in claim 1, wherein the packet pattern comprises at least an INVITE message.

7. A power management method for use in an electronic device connecting to a network, comprising:
   receiving a data packet via the network;
   determining whether the data packet conforms to a packet pattern;
   when the data packet conforms to the packet pattern, generating a wake-up signal; and
   in response to the wake-up signal, entering a normal state from a sleep state, and performing an application operation according to the data packet,
   wherein the power consumption in the sleep state is less than that in the normal state, and whether the data packet conforms to the packet pattern is determined by determining whether the data packet is a VoIP packet.

8. The method as claimed in claim 7, further comprising when the application operation is completed, entering the sleep state.

9. The method as claimed in claim 7, further comprising when the application operation is completed and when a predefined period has passed, entering the sleep state.

10. The method as claimed in claim 7, wherein the VoIP packet comprises an SIP INVITE request.

11. The method as claimed in claim 7, wherein the application operation comprises establishing a session connection according to the VoIP packet.

12. A non-transitory machine-readable medium comprising a computer program, which, when executed, causes an electronic device connecting to a network to perform a power management method, the method comprising:
   receiving a data packet via the network;
   determining whether the data packet conforms to a packet pattern;
   when the data packet conforms to the packet pattern, generating a wake-up signal; and
   in response to the wake-up signal, entering a normal state from a sleep state, and performing an application operation according to the data packet,
   wherein the power consumption in the sleep state is less than that in the normal state, and whether the data packet conforms to the packet pattern is determined by determining whether the data packet is a VoIP packet.

13. The non-transitory machine-readable medium as claimed in claim 12, further comprising when the application operation is completed, entering the sleep state.

14. The non-transitory machine-readable medium as claimed in claim 12, further comprising when the application operation is completed and when a predefined period has passed, entering the sleep state.

15. The non-transitory machine-readable medium as claimed in claim 12, wherein the VoIP packet comprises an SIP INVITE request.

16. The non-transitory machine-readable medium as claimed in claim 12, wherein the application operation comprises establishing a session connection according to the VoIP packet.

17. The non-transitory machine-readable medium as claimed in claim 12, wherein the packet pattern comprises at least an INVITE message.

* * * * *